United States Patent

Breens et al.

[11] 4,045,605
[45] Aug. 30, 1977

[54] CARPETING HAVING STIFF FIBERS

[75] Inventors: Leon Frank Haddon Breens, London; Dennis Lockhart Armitage, Bolton; Christopher Edward Summers, Swindon, all of England

[73] Assignees: Peter Smith Associates (Carpet Importers) Limited; Collie Carpets Limited, both of England

[21] Appl. No.: 697,526

[22] Filed: June 18, 1976

[30] Foreign Application Priority Data

June 24, 1975 United Kingdom ............... 26701/75

[51] Int. Cl.$^2$ .......................................... B32B 33/00
[52] U.S. Cl. ...................................... 428/88; 428/17; 428/89; 428/92; 428/97
[58] Field of Search ...................... 428/17, 88, 89, 92, 428/97

[56] References Cited

U.S. PATENT DOCUMENTS

| 2,815,558 | 10/1957 | Bartovics | 428/89 |
| 3,940,522 | 2/1976 | Wessells | 428/17 |

*Primary Examiner*—Marion E. McCamish
*Attorney, Agent, or Firm*—Dorfman, Herrrell and Skillman

[57] ABSTRACT

In a carpeting material of the kind comprising a backing fabric and fibres standing up from the backing fabric as pile or tufts, the pile or tuft fibres comprise 75 to 98 per cent by weight of conventional carpet fibres and 2 to 25 per cent by weight of stiff fibres or filaments arranged to act as dirt scrapers. The conventional carpet fibres are nylon, acrylic, regenerated cellulose, wool, polyester, cotton or polypropylene fibres, or a mixture of two or more of these, of less than 30 decitex per filament. The stiff fibres or filaments may be heavy monofilaments, for example of nylon, polyester or unplasticized polypropylene of from 30 to 300 tex, or they may be of metallic material. Alternatively, the stiff fibres can be in the form of twisted yarn which has been resinated to stiffen it.

Processes for making the carpeting material are also described and claimed.

9 Claims, No Drawings

CARPETING HAVING STIFF FIBERS

This invention relates to carpeting material, particularly carpeting suitable for entrance mats for office buildings, stores and the like. Mats used at present include mats of conventional carpeting not specially designed to scrape dirt off shoes, and mats having metal scraper bars. The present invention seeks to provide a mat having the general appearance and feel of carpeting but which also acts as a dirt scraper.

Carpeting material generally comprises a woven or non-woven backing fabric and fibres standing up from the backing fabric as pile or tufts. The invention provides a carpeting material whose pile or tuft fibres comprise 75 to 98 percent by weight of conventional carpet fibres and 2 to 25 percent by weight of stiff fibres or filaments arranged to act as dirt scrapers.

The conventional carpet fibres can be nylon, acrylic, regenerated cellulose, wool, polyester, cotton or polypropylene fibres or a mixture of two or more of these and generally are of less than 30 d.tex per filament, for example, about 10 to 20 d.tex per filament. The fibres are formed into yarns for example, of 200 to 1,000 tex by conventional spinning processes for carpet yarns. The stiff fibres or filaments are preferably heavy monofilaments, for example of nylon, polyester or unplasticised polypropylene of 30 to 300 tex. Metallic fibres or filaments of similar stiffness can also be used. Alternatively, the stiff fibres can be in the form of a twisted yarn which has been resinated to stiffen it.

The stiff fibres or filaments can be incorporated into the carpeting material by the same tufting machine or loom which inserts the tufts or pile of conventional carpet yarn. Preferably, the stiff fibres or one or more stiff filaments are fed to the tufting machine or loom together with the conventional pile or tuft yarn. The stiff fibres or filament may be fed in with each row of conventional pile or tuft yarn or in alternate rows or less frequently. Alternatively, one or more rows of conventional carpet yarn can be followed by a row of the stiff fibres or filament, The carpeting material can be combined with a backing layer or rubber or synthetic resin to form a mat. This backing layer can also serve to secure the tufts or pile to the backing fabric of the carpeting material and can if desired extend around the edges of the mat. The carpeting material can of course be laid as a continuous carpet or as carpet tiles rather than a mat if desired.

When the mat is trodden on the relatively soft conventional carpet fibres are trodden down but the stiff fibres or filaments. are more resistant to being trodden down and become more exposed to fulfil their dirt scraping function.

The invention is illustrated by the following Example

EXAMPLE

A 50 yards per ounce (620 tex) conventional carpet yarn formed from 60 percent by weight of "Evlan" (Trade Mark) 15 decitex regenerated cellulose filaments and 40 percent by weight of 18 decitex nylon filaments was tufted into a non-woven polyester backing fabric at 5/32 inch (4.0 mm) gauge. In every third row of the carpet yarn stiff nylon monofilament was introduced into each of the tufts, so that the latter contained a mixture of the carpet yarn and the stiff nylon monofilament. Each such tuft comprised a length of 150 tex nylon monofilament secured to the backing fabric at about its mid-point and having its ends reaching upwards to the same height as the carpet yarn fibres. The pile weight of the conventional carpet fibres was 32 ounces per square yard (1085 grams per square metre) and that of the stiff nylon monfilaments was 2.5 ounces per square yard (85 grams per square metre).

An entrance mat cut from the carpeting material produced was bonded to a polyvinyl chloride backing sheet so that the backing fabric and the base of the tufts were embedded in the polyvinyl chloride. The dimensions of the carpeting material and backing sheet were such that the composite mat produced had a one inch (25 mm) surround of polyvinyl chloride sheet.

What is claimed is:

1. A carpeting material comprising a backing fabric and fibres standing up from the backing fabric as pile or tufts, wherein the pile or tuft fibres comprise 75 to 98 percent by weight of conventional carpet yarns and 2 to 25 percent by weight of stiff fibres of filaments which are not plied with the conventional carpet fibre yarns and which are arranged to act as dirt scrapers, said carpet yarns being formed from fibres selected from the group consisting of nylon, acrylic, regenerated cellulose, wool, polyester, cotton and polypropylene fibres of less than 30 decitex per filament, and the stiff fibres or filaments being more resistant to being trodden down than the conventional carpet yarns.

2. A carpeting material according to claim 1, wherein the stiff fibres or filaments are heavy monofilaments of nylon, polyester or unplasticised polypropylene.

3. A carpeting material according to claim 2, wherein the monofilaments are of 30 to 300 tex.

4. A carpeting material according to claim 1, wherein the stiff fibres or filaments are metallic fibres or filaments.

5. A carpeting material according to claim 1, wherein the stiff fibres or filaments are in the form of a twisted yarn which has been resinated to stiffen it.

6. A mat comprising carpeting material according to claim 1 combined with a backing layer of rubber or synthetic resin.

7. In a process for preparing carpeting material in which conventional pile or tuft carpet yarns formed of fibres selected from the group consisting of nylon, acrylic, regenerated cellulose, wool, polyester, cotton and polypropylene fibres of less than 30 decitex per filament are fed to carpet forming machinery selected from the group consisting of tufting machines and carpet looms to form rows of pile or or tufts, the improvement comprising the step of feeding stiff fibres or at least one stiff filament to the carpet forming machinery together with a conventional pile or tuft carpet yarn so that the pile or tuft fibres of the carpeting material produced comprise 75 to 98 percent by weight of the fibres of said conventional carpet yarns and 2 to 25 percent by weight of the said stiff fibres or filaments, said stiff fibres or filaments being more resistant to being trodden down than said conventional carpet yarn so as to be capable of acting as dirt scrapers.

8. A process according to claim 7, wherein the stiff fibres or filaments are fed to the carpet forming machinery with every row of conventional pile or tuft yarn.

9. A process according to claim 7, wherein each row of pile or tuft yarn associated with stiff fibres or filaments is followed by one of more rows of the conventional tuft or pile yarn which does not contain the stiff fibres or filaments.